United States Patent [19]

Jones

[11] 4,277,672

[45] Jul. 7, 1981

[54] CONTROL CIRCUIT FOR CONTROLLING QUANTITY OF HEAT TO ELECTRICALLY HEATABLE WINDSHIELD

[75] Inventor: Dwight V. Jones, Baldwinsville, N.Y.

[73] Assignee: General Electric Company, Schenectady, N.Y.

[21] Appl. No.: 99,218

[22] Filed: Dec. 3, 1979

[51] Int. Cl.³ .......................................... H05B 1/02
[52] U.S. Cl. ................................. 219/497; 219/499; 219/203; 219/219; 219/510
[58] Field of Search .............. 219/494, 497, 499, 501, 219/202, 203, 507, 508, 219; 123/122 F, 142.5 E, 179 H; 307/117; 323/19

[56] References Cited

U.S. PATENT DOCUMENTS

| | | | |
|---|---|---|---|
| 2,462,207 | 2/1949 | Mershon | 219/203 |
| 3,553,428 | 1/1971 | McGhee | 219/494 |
| 3,571,560 | 3/1971 | Nilsson et al. | 219/202 |
| 3,881,085 | 4/1975 | Traister | 219/501 |
| 3,944,893 | 3/1976 | Hayden | 219/203 |
| 3,946,200 | 3/1976 | Juodikis | 219/497 |
| 3,955,067 | 5/1976 | Eldridge | 219/497 |
| 4,084,126 | 4/1978 | Clements | 219/202 |
| 4,117,307 | 9/1978 | Iverson et al. | 219/497 |
| 4,188,527 | 2/1980 | Follmer | 219/497 |

Primary Examiner—Gene Z. Rubinson
Assistant Examiner—M. Paschall
Attorney, Agent, or Firm—Marvin Snyder; James C. Davis

[57] ABSTRACT

A control circuit for electrically heatable windshields of automotive vehicles which controls the quantity of heat supplied by the vehicle alternator to the windshield heating element to be adequate for deicing the windshield yet limited to avoid windshield damage and to minimize decoupling time of the alternator from the vehicle battery. The control circuit, which employs an inexpensively installed temperature sensor element that senses ambient temperature, responds to the temperature difference between the ambient and a reference deicing temperature and to the supplied heating power for controlling the duration of the heating period.

8 Claims, 4 Drawing Figures

CONTROL CIRCUIT FOR CONTROLLING QUANTITY OF HEAT TO ELECTRICALLY HEATABLE WINDSHIELD

BACKGROUND OF THE INVENTION

The invention relates generally to the electrical system of an automotive vehicle and, more particularly, to control circuitry for controlling the supply of power to an electrically heatable windshield for providing deicing of said windshield.

Numerous electrical systems have been developed for deicing automotive windshields and backlites of the type which employ heating elements such as thin film metalization or a pattern of resistive heating wires embedded in the window material, which exhibit good optical transparency. A principal requirement of these systems is to supply power to the heating wires that, within safe limits of the window material, can provide a relatively rapid deicing of the window at temperatures well below freezing. This normally requires the generation of voltages substantially higher than the regulated battery voltage. Another requirement is to supply such heating power without adversely affecting the vehicle's battery charge requirements and electrical operation. A number of systems have been developed in which the standard vehicle alternator is employed to supply power to the resistive heating elements, the vehicle alternator for a short period being disconnected from the standard automotive circuit including the battery and load and connected to the resistive heating elements for the purpose of deicing. During this period the alternator can supply voltages substantially higher than the regulated battery voltage, while the battery supplies the normal automotive load. At the end of the period, the alternator is reconnected to the regulator and standard load circuit. It is desirable to terminate the heating periods in some controlled fashion so that the window material is not excessively heated, which may cause damage, and so that the battery is not overly utilized to supply the system load requirements. A well known manner of controlling the duration of the heating period is to sense the window surface temperature, and to terminate the supply of heat upon a certain temperature being reached. Such form of control requires the use of temperature sensor elements that are either embedded within the window material or attached to the window. These systems are costly and undesirable for a number of reasons. The need for added electrical connections to the window, and the sophisticated fabrication techniques required for embedded sensor elements are distinct limitations. In addition, both the embedded and attached sensors must provide a distributed sensing function for sensing temperature throughout the area of the window surface, and must be mounted so as to not impair good vision.

SUMMARY OF THE INVENTION

It is accordingly an object of the invention to provide a novel and improved heater control circuit for automotive windshields that controls the quantity of heat required for deicing purposes without the need for sensing windshield temperature.

Another object of the invention is to provide a novel and improved heater control circuit as above described that is inexpensive to fabricate and install.

Another object of the invention is to provide a novel and improved heater control circuit as above described that is temperature responsive and yet need not employ a temperature sensor element that is embedded in or attached to the windshield and therefore avoids the need for added electrical connections and other disadvantages associated with this form of sensor element.

These and other objects of the invention are accomplished by a heater control circuit for controlling the quantity of heat supplied to windshield heater means, comprising first means for generating a first output that is a function of the power supplied to said heater means by the vehicle alternator during controlled heating periods, and temperature sensor means having a resistance that is a function of temperature for sensing the ambient temperature. A second means, including said temperature sensor means, generates a second output that is a function of the temperature difference between said ambient temperature and the deicing temperature, and third means, responsive to said first and second outputs and exhibiting an electrical response corresponding to the thermal response of the windshield, generates a third output as a function of time that is employed for controlling the duration of said heating periods in which power is supplied to said heater means.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

DESCRIPTION OF THE PREFERRED EMBODIMENTS

Figure 1:
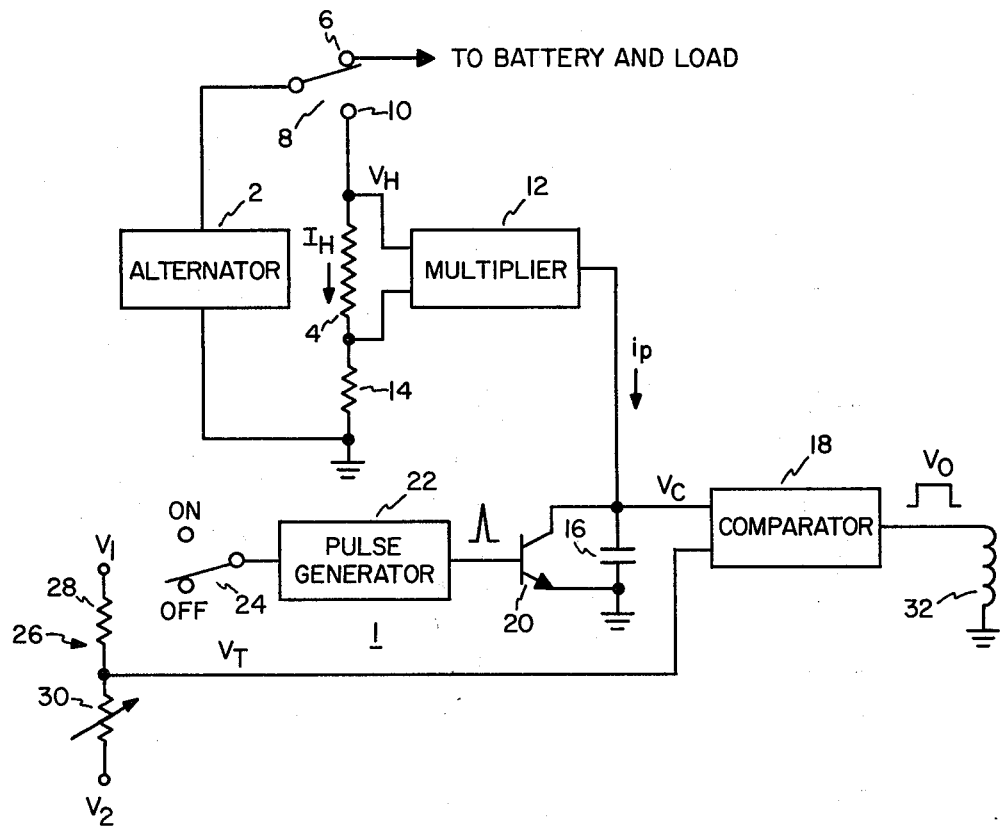
FIG. 1 is a schematic block diagram of a heater control circuit in accordance with a first embodiment of the invention.

Referring to FIG. 1 there is illustrated a schematic block diagram of a heater control circuit 1 for an automotive electrical system, in accordance with a first exemplary embodiment of the invention, which controls the quantity of heat energy supplied by the vehicle alternator 2 to a resistive heating element 4 for deicing purposes. Heating element 4 typically is embedded in the vehicle windshield and/or other window by one of several known techniques. Operation of the control circuit is based upon the amount of heat required to raise the temperature of the windshield from a given ambient temperature to a deicing temperature. This is effected by controlling the duration of power supplied to the heating element, whereby the circuit: (1) ensures that the requisite amount of energy is supplied to the heating element for the deicing function, i.e., developing a water film on the surface of the windshield, for a range of ambient temperatures and for variable alternator output voltages such as may result from change in engine speed; (2) avoids damage to the glass that can result from the application of excessive heat; and (3) contributes to the efficiency of the system by minimizing the time the alternator is decoupled from the vehicle battery and standard load circuit.

In the illustrated electrical system, the output of electric alternator 2, which is a standard automotive component, normally is connected through contact 6 of switching device 8, schematically shown as a mechanical switch, for energizing the battery and load circuit. During heating periods, the alternator output is connected through contact 10 for supplying energy to resistive heating element 4, which is shown as a single resistor but may comprise additional resistors for heating the backlite and other vehicle windows. The control circuit controls the duration of the heating periods.

Included in the control circuit is a multiplier component 12 having a first input coupled from the high voltage terminal of resistive element 4, providing a measure of the voltage $V_H$ across element 4, and having a second input coupled from the junction of element 4 and a grounded resistor 14, providing a measure of the current $I_H$ through the resistive heating element. Multiplier 12 is a conventional component for generating a current output ip that is proportional to the product of the two inputs $V_H$ and $I_H$. Alternatively, the two inputs to multiplier 12 could be obtained from $V_H$ alone and resistor 14 not required. In such case the resistance R of element 4 is included in the scale factor of multiplier 12 and ip is made proportional to $V_H^2/R$. One exemplary component that may be employed for multiplier 12 is a linear four quadrant multiplier integrated circuit, Motorola MC 1595L. The output of multiplier 12 is coupled to one terminal of a capacitor 16, the other terminal of which is at ground, for developing a voltage $V_c$ that is applied to a first input of a comparator network 18. An NPN transistor 20 has its collector coupled to the high voltage terminal of capacitor 16, its emitter coupled to ground and its base coupled to a pulse generator network 22, the operation of which is controlled by an on-off switch 24. The transistor serves to preset the capacitor to an initial discharged condition at the commencement of each heating period.

The control circuit 1 also includes a voltage divider network 26 having a fixed resistive element 28 connected in series with a temperature sensor element 30 exhibiting a resistance which varies as a function of the ambient temperature. In the present example, element 30 has a negative temperature coefficient and may be one of several types of inexpensive sensor elements such as a thermistor. Alternatively, elements 28 and 30 could be interchanged and there employed a positive temperature coefficient temperature sensor such as a string of signal diodes. Advantageously, the temperature sensor element can be made an integral part of the control circuit, physically located in a convenient space with other electrical components and requiring only that it be responsive to the ambient temperature. A voltage source $V_1$ is coupled to one terminal of resistor 28 and a voltage source $V_2$ is coupled to one terminal of temperature sensor 30. A voltage $V_T$ appearing at the junction of the elements is coupled as a second input to comparator 18. Voltage $V_T$ is referenced to a reference voltage $V_{REF}$, which is the junction voltage for a temperature sensor resistance corresponding to 32° F. 32° F. is selected for the reference deicing temperature because it is the temperature to which the glass must be heated to develop a water film on the windshield surface. In one exemplary form of the voltage divider network, the resistance value of resistor 28 and that of sensor 30 for a temperature of 32° F. are equated to one another and the voltage values of $V_1$ and $V_2$ are related by $V_1 = -V_2$, so that the reference voltage $V_{REF}$ is set equal to zero. Therefore, the voltage $V_T$ alone provides a measure of the temperature difference between the ambient temperature and the deicing temperature 32° F.

The output of the comparator network 18 is coupled to a relay coil 32 for controlling the switching action of switch 8. Comparator 18 is a conventional circuit component for comparing two applied input signals and providing an output signal $V_o$ in accordance with the relative magnitude of the input signals. It may comprise either analog or digital circuits, or a combination of the two. In the exemplary embodiment of the invention being considered, it comprises primarily digital circuitry preceded by analog to digital conversion circuitry for operating on the analog inputs. It accordingly generates one of two digital output signals in accordance with which of the input signals $V_T$ or $V_C$ is the greater. In addition, since the input signals applied to comparator 18 are of both an increasing and decreasing nature, the comparator is designed preferably to exhibit a well known hysteresis characteristic whereby the output state changes at one level of an increasing signal $V_C$ that is slightly higher than $V_T$ and at a different level of a decreasing signal $V_C$ that is slightly lower than $V_T$.

With respect to an understanding of the operation of the control circuit of FIG. 1, it will be useful to first consider certain thermal properties of the glass window material when heated by the heating element 4. It takes a certain quantity of heat energy to raise the temperature of the glass from some given ambient temperature to a final deicing temperature of 32° F., at which temperature a water film will develop on the surface of the window allowing the ice to fall off or be readily removed. This quantity of heat energy depends primarily upon the specific heat $K_w$ of the glass material, specific heat defined as the heat required to raise the temperature of a given quantity of glass by 1° F., and the temperature difference $\Delta T$ between the ambient temperature and 32° F. If the power level is sufficiently high, radiation and conduction losses will be relatively small and essentially all of the supplied heat energy goes toward raising the temperature of the glass. The thermal response of the glass may be expressed as follows:

$$t_{p1} = (K_w)\left(\frac{\Delta T}{V_H \cdot I_H}\right) \quad (1)$$

where $t_{p1}$ is the period during which power $V_H \cdot I_H$ in the heating element is applied for a rise in temperature of $\Delta T$.

A corresponding expression is employed to describe the operation of the heater control circuit, as follows:

$$t_{p2} = (C)\left(\frac{V_{REF} - V_T}{i_p}\right) \quad (2)$$

where $V_{REF} - V_T$ is proportional to $\Delta T$, ip is proportional to $V_H \cdot I_H$, C is the capacitance of capacitor 16 and proportional to $K_w$, and $t_{p2}$ is period during which current ip is the conducted for a change in capacitor voltage of $V_{REF} - V_T$. With the proper scale factors assigned to the quantities in expression (2), it may be appreciated that $t_{p2}$ can be equal to $t_{p1}$. It is also noted that with $V_{REF}$ set equal to zero, the numerator contains solely the term $V_T$.

Figure 2:
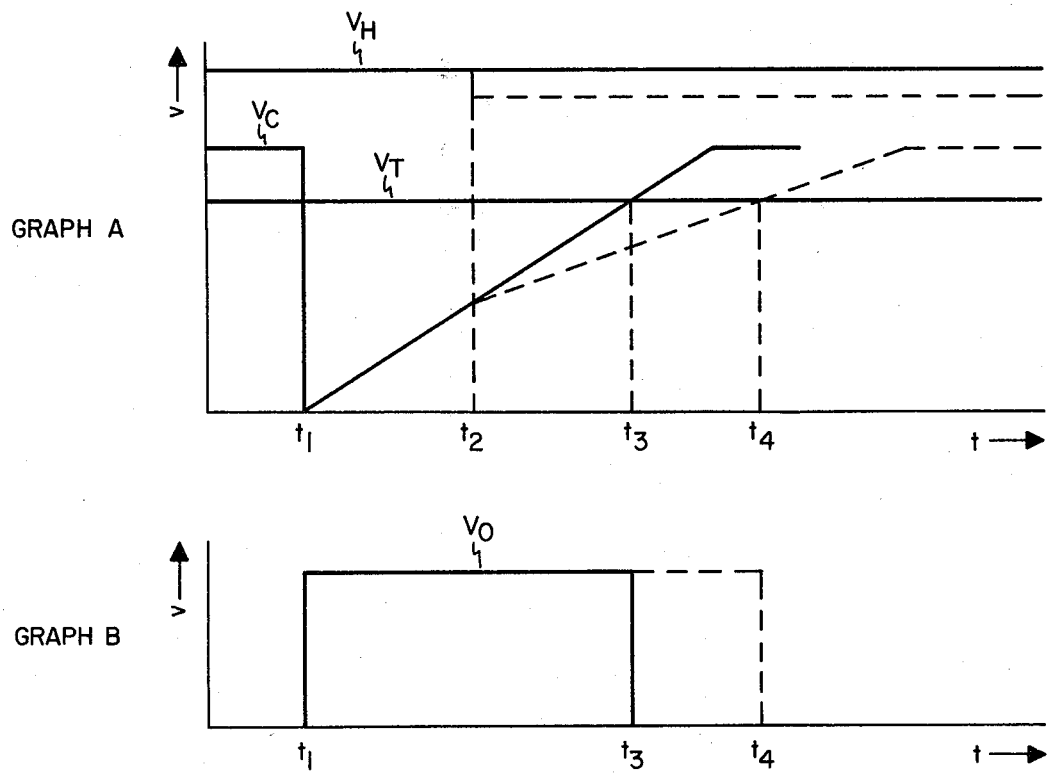
FIG. 2 is a series of graphs useful in describing the operation of the heater control circuit of FIG. 1.

To initiate a heating operation under control of the control circuit of FIG. 1, capacitor 16 is discharged through transistor 20. This action is schematically represented by the actuation of switch 24 to the ON position which generates a trigger pulse from generator 22 for causing transistor 20 to briefly conduct, rapidly discharging the capacitor. As illustrated in the graph A of FIG. 2, the capacitor voltage $V_c$, a first input to comparator 18, rapidly falls to zero voltage essentially at time $t_1$, the start of the heating operation. As $V_c$ falls below $V_T$, the second input to comparator 18, the comparator output $V_o$ changes state and abruptly rises from zero voltage to a positive voltage level, as shown by graph B or FIG. 2. This causes relay coil 32 to be energized for switching switch 8 from its normal engagement of contact 6 to engagement of contact 10. The alternator output supplies power to heating element 4, generating a voltage $V_H$ across the element with a current $I_H$ flowing through the element. Resistor 14 serves to develop a voltage across it that is a function of $I_H$. The input quantities applied to multiplier 12 are multiplied together with a suitable scale factor to generate current ip at the output. This current serves to charge capacitor 16 and increase voltage $V_c$ toward voltage $V_T$, as illustrated in graph A.

As previously noted, the voltage $V_T$ referenced to $V_{REF}$ is a function of the temperature difference $\Delta T$ between the ambient temperature and 32° F. As previously noted, voltage divider network 26 includes a fixed resistor 28 and temperature sensor 30 exhibiting a negative temperature coefficient, with the resistance and voltage source values established such that $V_{REF}$ is equal to zero and the voltage $V_T$ itself is a function of $\Delta T$. Accordingly, the lower the ambient temperature, the greater the resistance of sensor 30 and the greater the level of voltage $V_T$. Upon the capacitor voltage $V_c$ exceeding $V_T$, the comparator output switches state and $V_o$ goes to ground, as shown at time $t_3$ in graphs A and B. The coil 32 is once again de-energized and switch 8 is released to engage contact 6. The time duration between $t_3$ and $t_1$ may be appreciated to define the controlled heating period, during which the current ip charges capacitor 16, and is equal to $t_p2$ in expression (2). As represented in graph A, the current ip is caused to flow briefly beyond $t_3$ for raising to capacitor voltage $V_c$ to a peak level slightly above $V_T$ for the purpose of accommodating the operation of the comparator network.

As indicated by expression (2), the heating period is a partial function of the voltage $V_H$. Should this voltage vary, as from a change in the alternator output voltage or for whatever other reason, the current ip will correspondingly vary to change the rate of charge of the capacitor. This in turn changes the duration of the heating period. To illustrate this operation, in graph A of FIG. 2 the voltage $V_H$ is illustrated by a broken line to drop in level at time $t_2$, resulting, for example, from a sudden decrease in engine speed. This causes the slope of the $V_c$ curve to be reduced, also illustrated by broken line, and extends the heating period from what it is with the original level of $V_H$ maintained, i.e., from $t_3$ to $t_4$.

In summary, the heater is energized for a period corresponding to that required to supply the amount of energy required to raise the glass temperature to 32° F. as determined by the specific heat of the glass material $K_w$, which is a scale factor that is included in the circuit constants, and also corresponding to the power supplied by the alternator 2 to the heater element 4. By way of example, in a typical operation heater power of 1000 watts, as may be provided by a $V_H$ of 25 volts and an $I_H$ of 40 amps, applied for a heating period of two minutes generates heat energy of 120,000 watt-seconds. This is sufficient to raise the surface temperature of a typical automotive glass windshield by several degrees Fahrenheit.

Figure 3:
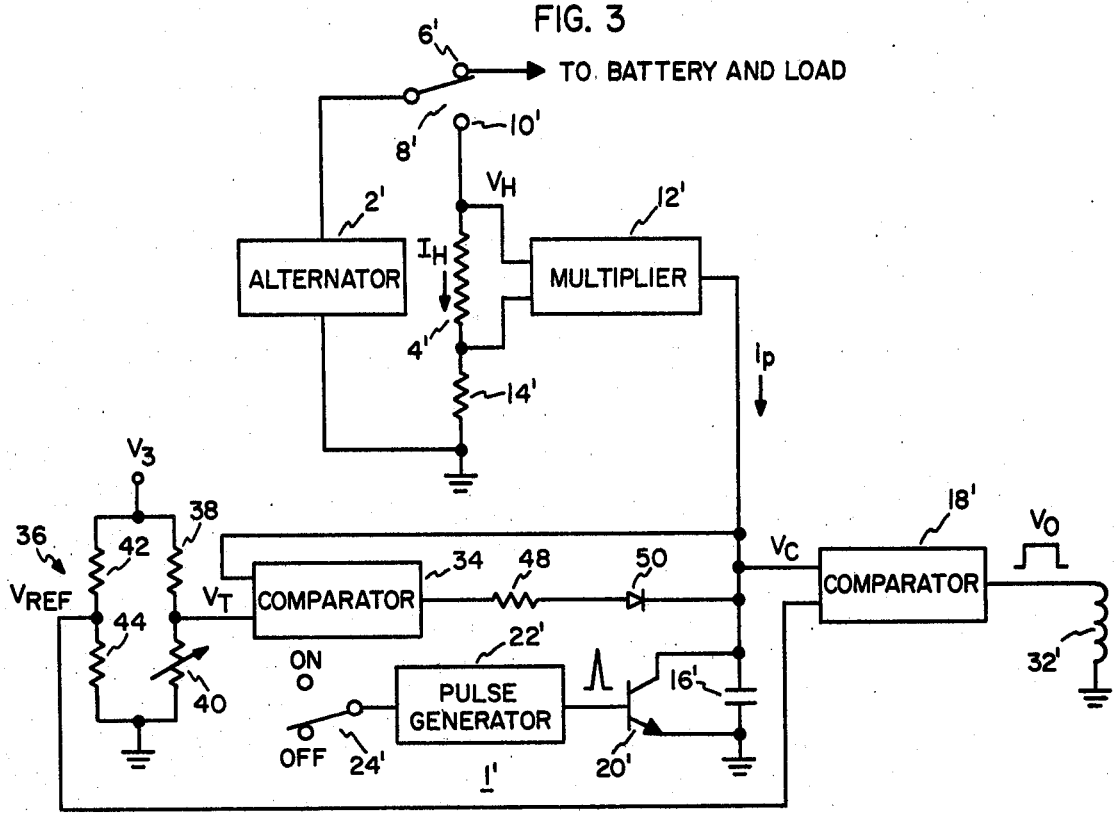
FIG. 3 is a schematic block diagram of a heater control circuit in accordance with a second embodiment of the invention.

In FIG. 3 is illustrated a schematic block diagram of a heater control circuit 1' in accordance with a second exemplary embodiment of the invention. Similar components in FIG. 3 as in FIG. 1 are identified by the same reference legends, but with an added prime notation. As in the first embodiment, the control circuit 1' includes a multiplier 12' for generating a current ip as a function of the product $V_H \cdot I_H$, ip serving to charge capacitor 16' to develop voltage $V_c$. This voltage is applied to the first input of comparator 18' and also to the first input of a second comparator network 34. Transistor 20 provides an initial discharge of the capacitor.

In this embodiment, however there is provided a voltage divider network 36 requiring a single voltage source $V_3$. The network has a pair of branches, the first branch including a fixed resistive element 38 with one terminal connected to $V_3$ and the other serially connected with a temperature sensor element 40 to ground, element 40 having a positive temperature coefficient. Temperature sensor 40 may be composed of an inexpensive device such as several series of coupled signal diodes. The second branch includes two fixed resistive elements 42 and 44 serially connected between $V_3$ and ground. The relative values assigned to resistive elements 42 and 44 develop at their junction reference voltage $V_{REF}$ which provides a measure of the reference deicing temperature 32° F. The voltage $V_{REF}$ is coupled to the second input of comparator 18'. Voltage $V_T$, providing a measure of the ambient temperature, is developed at the junction of elements 38 and 40, this voltage being coupled to the second input of comparator network 34. The output of comparator 34 is coupled through a current limiting resistor 48 and series coupled diode 50 to the high voltage terminal of capacitor 16'. In the instant embodiment, the relative values of resistive element 38 and sensor element 40 for ambient temperature of 32° F. provides a voltage $V_T$ equal to $V_{REF}$, the voltage $V_T$ being reduced in accordance with a reduced ambient temperature. Accordingly, the difference between the two voltage components $V_{REF}$ and $V_T$ is a function of the temperature difference at $\Delta T$ between 32° F. and the ambient temperature.

It may be appreciated that an alternative construction may be used for the first branch of network 36 where elements 38 and 40 are interchanged and there is employed a negative temperature coefficient temperature sensor.

Figure 4:
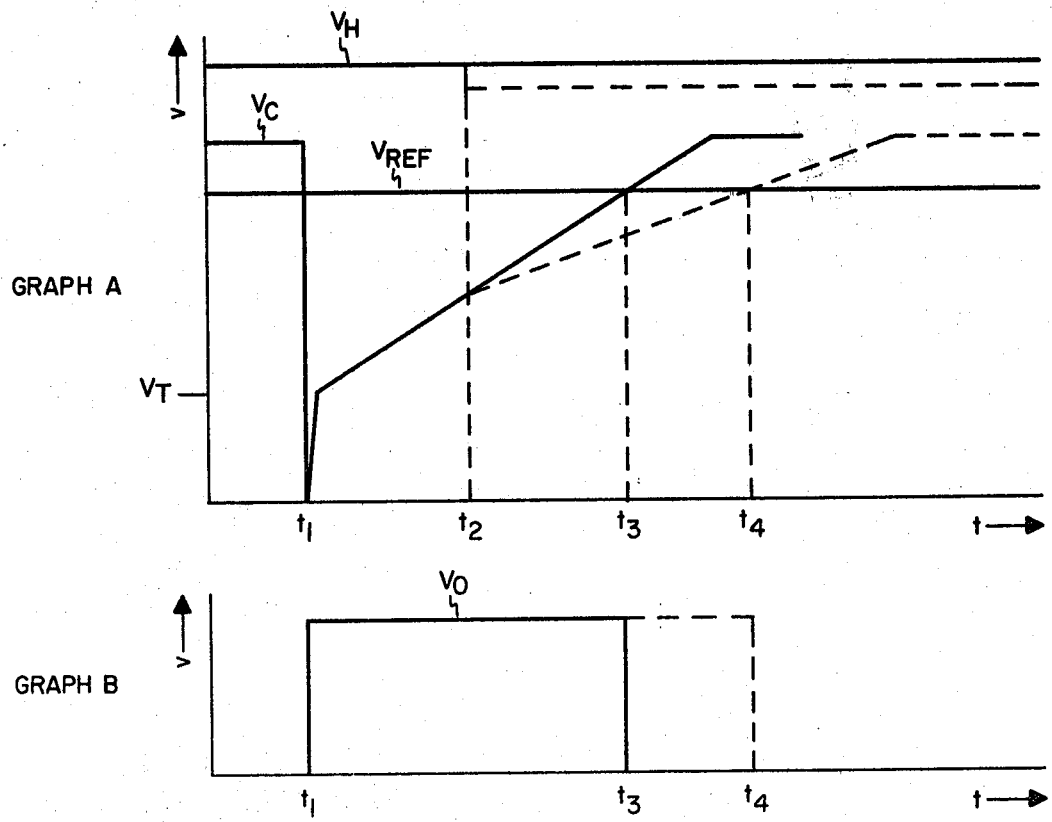
FIG. 4 is a series of graphs useful in describing the operation of the heater control circuit of FIG. 3.

The operation of the control circuit 1' is similar to that previously considered with respect to the first embodiment, with several minor differences to be noted. Thus, transistor 20' is made to briefly conduct at the commencement of a heating operation for rapidly discharging the capacitor 16'. As the capacitor voltage $V_c$ falls to zero at time $t_1$, the $V_o$ output of comparator 18' changes state and abruptly rises from zero voltage to a positive voltage level, shown in graph B of FIG. 4. In similar manner the output of comparator 34 briefly changes state, generating a positive voltage for providing a rapid change through resistor 48 and diode 50 to the capacitor 16' to quickly raise the capacitor voltage to $V_T$, as shown in graph A of FIG. 4. Upon $V_c$ exceeding $V_T$, the output state of comparator 34 reverts back to the zero voltage level which discontinues the rapid charge.

The positive voltage output of comparator 18' energizes relay coil 32' to bring contact 10' into engagement and commence the supply of power from alternator 2' to heating element 4'. As a result, the generated current $i_p$ serves to charge capacitor 16' from voltage $V_T$ to voltage $V_{REF}$. Upon $V_c$ exceeding the level of $V_{REF}$, the comparator 18' output switches state and $V_o$ goes to ground, as shown at time $t_3$ in graphs A and B of FIG. 4. De-energization of coil 32' releases switch 8' to engage contact 6' and terminate the heating period. Thus, as considered with respect to the first embodiment of the control circuit, the time duration between $t_3$ and $t_1$ is the period $t_{p2}$ in expression (2). Graph A of FIG. 4 also illustrates how this period $t_{p2}$ is a function of the heater voltage $V_H$, represented by a drop in level at $t_2$ and a resulting reduction in the slope of the $V_c$ curve which extends the heating period from $t_3$ to $t_4$.

While the invention has been described with respect to two specific embodiments, it may be appreciated that numerous modifications can be made to the disclosed circuits by ones skills in the art without exceeding the basic teachings herein set forth. For example, with small circuit modification to the embodiment of FIG. 1, the circuit operation can be essentially inverted with the same function performed as hereinbefore described. In such case, the relative resistance values of the voltage divider network 26 would be established to generate a reference voltage $V_{REF}$ that is of large positive value. The capacitor 16 is preset by being rapidly charged to this voltage $V_{REF}$ and $i_p$ is made to be a discharger current that reduces the capacitor voltage $V_c$ as a function of heater power until, as before, the value of $V_T$ is reached. Correspondingly in the embodiment of FIG. 3 the preset operation may be modified by initially charging the capacitor 16 to some high level positive voltage followed by a discharge to voltage $V_T$. The appended claims are intended to include these and all such modifications that fall within the true scope and spirit of the invention.

What I claim as new and desire to secure as Letters Patent of the United States is:

1. A heater control circuit for an automotive electrical system that includes an electric alternator which supplies power to window heater means during controlled heating periods for window deicing purposes, said control circuit comprising:

(a) first means for generating a first output that is a function of the power supplied to said heater means by said alternator during said controlled heating periods, (b) temperature sensor means for sensing the ambient temperature, (c) second means, including said temperature sensor means, for generating a second output that is a function of the temperature difference between said ambient temperature and a deicing temperature, and (d) third means, responsive to said first and second outputs and exhibiting an electrical response corresponding to the thermal response of the window, for generating a third output as a function of time for controlling the duration of said heating periods, whereby there is supplied to said heater means a quantity of heat sufficient to provide deicing of the window.

2. A heater control circuit as in claim 1 wherein said first means is responsive to at least the voltage across said heater means for generating said first output in the form of a current component that is proportional to the power supplied to said heater means.

3. A heater control circuit as in claim 2 wherein said temperature sensor means includes a resistance element whose resistance is a function of temperature, and said second means further includes a resistive voltage divider network having said resistance element coupled in one leg thereof, said network generating said second output in the form of at least one voltage component.

4. A heater control circuit as in claim 3 wherein said third means includes capacitive means responsive to said current component for generating a capacitor voltage, and comparison mean responsive to said capacitor voltage and to at least one voltage component of said second output for generating said third output.

5. A heater control circuit as in claim 4 wherein said first means includes a multiplier component.

6. A heater control circuit as in claim 5 which further comprises means, coupled to said capacitive means, for establishing an initial charge condition for said capacitive means for each of said controlled heating periods.

7. A heater control circuit as in claim 6 wherein said voltage divider network is coupled to a pair of voltage sources for generating said second output as a single voltage component that is a function of said temperature difference.

8. A heater control circuit as in claim 6 wherein said voltage divider network is coupled to a single voltage source for generating said second output as first and second voltage components whose difference is a function of said temperature difference.

* * * * *

UNITED STATES PATENT AND TRADEMARK OFFICE
CERTIFICATE OF CORRECTION

PATENT NO. : 4,277,672

DATED : July 7, 1981

INVENTOR(S) : Dwight V. Jones

It is certified that error appears in the above—identified patent and that said Letters Patent is hereby corrected as shown below:

Column 4, line 64, after "is" insert -- the --.

Column 4, line 65, delete "the ".

Signed and Sealed this

Tenth Day of November 1981

|SEAL|

Attest:

GERALD J. MOSSINGHOFF

Attesting Officer

Commissioner of Patents and Trademarks